Figure 1:
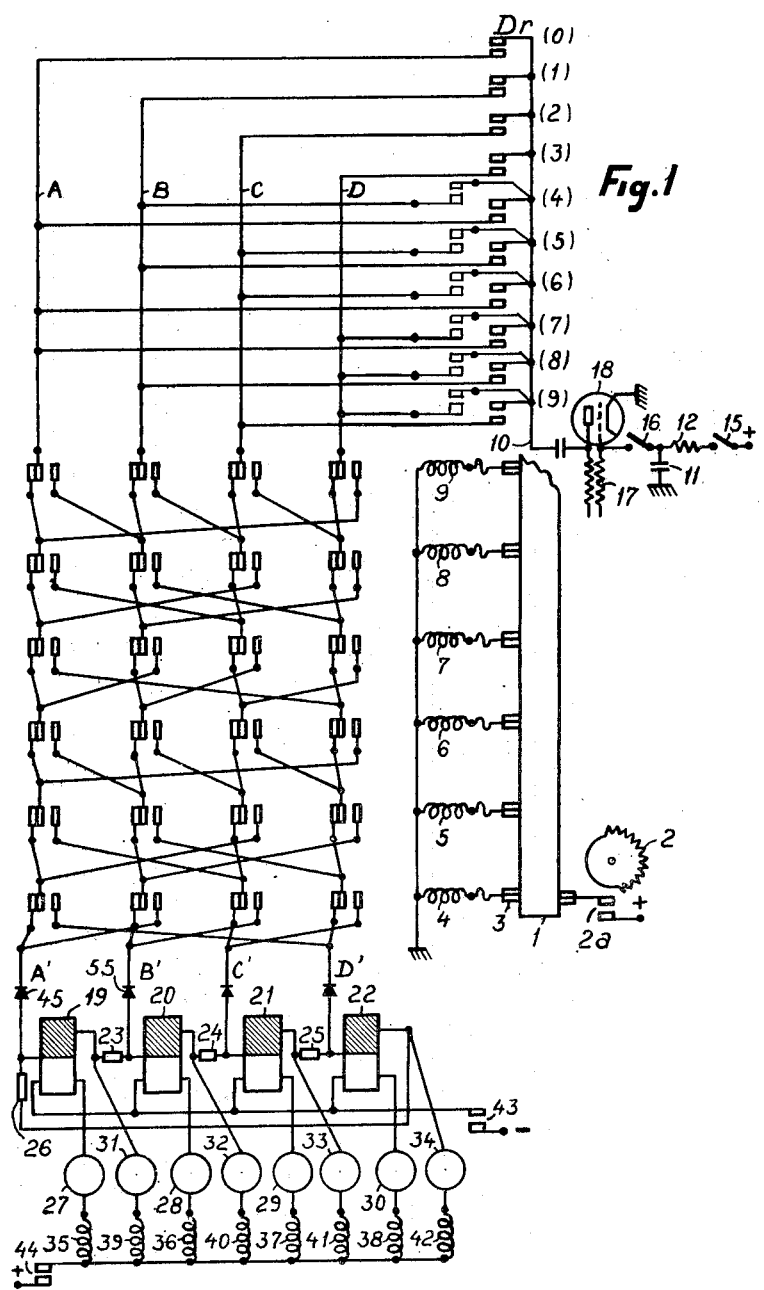

2,797,868
APPARATUS FOR CALCULATING CHECK ELEMENTS OF RECORDED DATA

Raymond Henry Elie Marie Béranger, Paris, France, assignor to Compagnie des Machines Bull (Societe Anonyme), Paris, France Application May 18, 1954, Serial No. 430,629

Claims priority, application France May 20, 1953

5 Claims. (Cl. 235—61.7)

The present invention relates to a method and apparatus for calculating elements of a check symbol of recorded data.

More particularly the invention, herein described, relates to the establishment of characteristic elements of a check symbol provided for checking the transcription and the sensing of data recorded in the form of marks located in index point positions of so called "vertical columns" of a record for record controlled machines, or of data recorded in registering and storing means of these machines.

Representative examples of the prior art may be found in United States application Serial No. 190,507, now Patent No. 2,759,669, filed October 17, 1950, and in United States application Serial No. 237,042, filed July 16, 1951.

The first of these applications relates mainly to a check of concordance between recorded data and a check symbol recorded in the form of a single mark in a special column of record cards or strips for record controlled machines; a similar check between same data and same symbol being also able to be carried on the registering and storing means of these machines. The value of the check symbol in this case is a difference between the sum of the values of the digits of even rank and the sum of the values of the digits of uneven rank in the data, said difference being the positive arithmetical difference from which is subtracted the highest included multiple of a determined number.

The second of these applications relates mainly to another check of concordance between recorded data and a recorded check symbol. In this second application, the check symbol is recorded in the form of at least one mark in a special column. The value of each mark representing an element of the check symbol is determined by an allocation of a check value to each of the columns of the record provided for the data successively, for each of so called "horizontal" lines of the data, the check values of the columns including marks in said line are added and simultaneously the highest included multiple of a determined number is subtracted of the values added, the result is then multiplied by the index point value of said line and simultaneously the highest included multiple of same determined number is subtracted of the product; the new result is then entered in a cyclic counter working on a base equal to said determined number to obtain at the end of the entering of these results for every line of the data the value of one element of the check symbol.

The present invention relates mainly to a check of concordance between elements of a check symbol and related data offering definite advantages over the check methods of the prior art cited. Its mode of calculation offers also further advantages. The whole of the elements of the check symbol can be established by a single simple calculating device, as it will be shown in the example of embodiment hereinafter described. These elements are calculated or established by an entering in the calculating device, for each line of a record containing recorded data, of a code value or of code values predetermined for each index point positions used in the record for recording data and of a check value characteristic of the column in which a mark is recorded, the successive enterings for every line operating the calculating device which indicates at the end of these enterings the value of elements representatives of denominational orders of the check symbol. As it will be shown in the example of embodiment, this check symbol can be readily recorded in the form of check marks on same record as soon as said enterings are ended, this is one of the advantages over the second application cited. Moreover, the value of the check symbol defined by its denominational orders is practically and easily enough great to afford a great security, whereas the values of the element or the elements of the check symbols in the prior art cited are, in the most practical embodiments, restricted to the values represented by the index point positions in a column of the record.

It will be seen therefrom that the values of the elements of the check symbol are necessarily less than the highest value which can be registered in a card column, that is to say, 11 or 12 in practice. Thus, the security against possible errors, which depends upon the notation base in which the symbol is expressed, remains somewhat limited. Moreover, the immobilisation of a column for entering therein a symbol which does not in itself necessarily perform any active part in the calculations which the accounting machine may have to perform, may be disadvantageous.

In order to avoid these disadvantages, the method according to the invention relates to the registration of the marks or perforations representing the check indication which performs the function of the aforesaid symbol, along a line of the card, and preferably along a line not used for the normal purposes, for example the twelves line (in a card of conventional type). As an accessory feature, it is also proposed in accordance with the invention to disposed the said marks along the said line over at least a part of the length of the card, so as to extend over a distance which may be greater than the width of the zone for the recording of the data.

The invention comprises among other devices a device permitting of determining the states of equilibrium of the elements of a registering device, which elements must correspond to the marks or perforations of the said check indication in the card, it being understood that such a device works in cooperation with a utilisation member which may be, according to requirements, either a perforating or marking mechanism or a member for comparing the check indication formed in the registering device with the check indication read on the card. There is thus obtained for the data entered on record cards for accounting machines either a device for punching or marking the check indication or a device for checking transcription errors. The example given in Figure 1, in conjunction with the following explanations, by way of non-limitative illustration to enable the invention to be more readily understood, relates to the first case (punching device).

In Figure 1, the record card is assumed to pass between a roller 1 fed with voltage at each index point by a cam 2 closing a contact 2a connected to a voltage source, and brushes 3, so that when the datum recorded on the card by means of perforations passes under the said brushes, the relays 4 to 9 (it is assumed that the datum extends over six columns) are energized at the corresponding points of the cycle. A distributor Dr closes its contacts at the same instances, (9) to (0), at the same time as the make-and-break contacts of the relays 4 to 9. The line 10 of the distributor is not fed continuously with voltage, but a capacitor 11 is charged through a resistor 12, with the aid of a cam (not shown) which actuates a contact 15 in the interval between two successive machine points. The contact 16 then closes, a little after the closing of the contact or contacts of the distributor Dr, which must close at this instant, so that the capacitor 11 is discharged through the resistor 17 connecting the control grid of the valve 18 to a negative blocking potential. Consequently, the valve 18 is unblocked for a brief instant, and since the plate of this valve is connected to the line a brief negative impulse is transmitted through the line 10 (the duration of this impulse being determined by the time constant of the capacitor 11 combined with the resistor 17).

The said impulse encounters in its passage contacts which have taken up their position of equilibrium (closing or opening) and may be routed and transmitted to the cyclic registering device formed by electronic triggers 19 to 22 as shown by the diagram. The connections between the contacts are arranged to satisfy the following conditions:

At each machine point from 9 to 0 (these index point values being successively presented by the card to the brushes), there are set up by means of the distributor Dr one or more impulses, each of which is always transmitted to the registering device 19–22, being routed through 4 input channels ABCD which lead, in accordance with an interconnection which may be variable, under the influence of the relays 4 to 9, to the four input channels A'B'C'D' of the registering device through uni-directional elements 45. The combinations of the channels ABCD correspond distinctly and invariably to the points 0 to 9. Thus, B alone corresponds to the point 1 and the combination B–C to the point 5. If no relay 4–9 is energised, the contacts of these relays remain in the inoperative position, and the same combination is transmitted and represents the admission of corresponding impulses into the registering device. Thus, if there is no 1 in the datum, an impulse enters the registering device at B' at the instant called "point 1," and if there is no 5 in the datum, two impulses are simultaneously fed at B' and at C' into the registering device at the machine point 5.

The code values represented by impulses can be predetermined by any arrangement of the connections between distributor Dr and the entry of the calculating device.

These values depend also on the type of indicator or registering device of the calculating unit, that indicator or registering device, in the present example, a binary cyclic counter, these values being those indicated in the following table:

Table I

| Index points | Input connections | Code values |
| --- | --- | --- |
| (9) | CD | 12=4+8 |
| (8) | BD | 10=2+8 |
| (7) | AD | 9=1+8 |
| (6) | AC | 5=1+4 |
| (5) | BC | 6=2+4 |
| (4) | AB | 3=1+2 |
| (3) | D | 8 |
| (2) | C | 4 |
| (1) | B | 2 |
| (0) | A | 1 |

The make-and-break contacts of the relays 4–9 are so connected as to effect cyclic shifts of the feed lines on the base 4. It will be seen that the contacts of the relays 9 and 6 effect a shift by one order, those of the relays 8 and 5 a shift of two orders, and those of the relays 7 and 4 a shift of three orders (or of one order in the inverse direction to those of the relays 6 and 9, since there are four feed lines). If, for example, there is a 1 in the card column corresponding to the relay 8, a shift of two orders at the point 1 results, and the impulse is applied at D' at this instant instead of at B' as before. It will be seen that with this device the number of impulses entered in the registering device remains constant, only their distribution among the inputs A'B'C'D' varies as a function of the datum.

Such a registering device, for example, made of four electronic bistable triggers of a known type (such as the triggers described in United States application Serial No. 171,684, filed January 7, 1950), their circuits being adapted to the present example of embodiment. The connections of such a trigger are described hereinafter together with those of an example of an utilization circuit with reference to Figure 2 on which they are illustrated.

Each trigger has two positions of stable equilibrium, one called the inoperative position and the other the operative position, and it changes from one to the other when it receives an impulse. This impulse may reach it through one of the input channels A'—D', or it may be applied thereto by the preceding trigger if this trigger changes from the operative position to the inoperative position. The delay elements 23—26 have a delay sufficient for the triggers concerned (21 and 22), when two impulses are simultaneously applied, for example to C' and D', first to take up their respective new positions of equilibrium, and then if the first of the two triggers has thus changed from the operative position to the inoperative position, the impulse which it applies to the following one finds this trigger stabilised. The lower valves of the triggers are connected to gas discharge valves, for example of the thyratron type, 27 to 34 which permit of feeding punching electro-magnets 35 to 38. According to circumstances, it is possible to have from zero to four electro-magnets being fed, the distribution of the energised electromagnets being variable and these electromagnets punching in the card, along a so-called horizontal line (that is to say, a line perpendicular to the columns in which the numerical data are recorded in the proportion of one marked or perforated index point value per column), preferably along the twelves line, a check indication consisting of perforations in at least four positions. In a modification, double the number of positions, i. e. eight may be provided one of every two of which is always perforated, owing to the action of the thyratrons 31 to 34 and of the electromagnets 39 to 42 similar to those previously mentioned. The punching electromagnets can be energised only at the point 12 by the closing of the cam contact 44. At the point 13, a current impulse applied by a cam contact 43 returns the triggers into the inoperative position.

Figure 2:
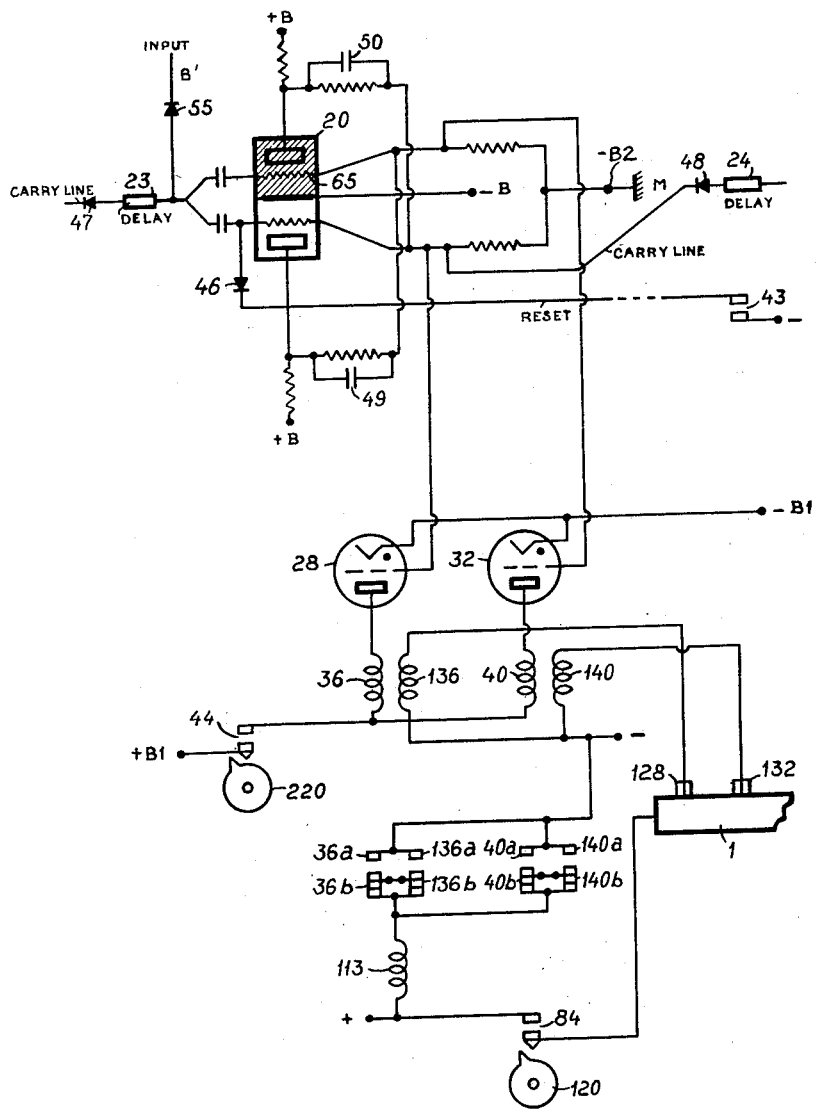

The circuits illustrated in Figure 2 are applied to trigger 20 of Figure 1 and show how a comparison can be made, for example, between one check mark representing an element of the check symbol and one of the calculated resulting values.

One of these calculated values is indicated by the state of bistable trigger 20: the grid of its conducting tube (65 on the Figure 2) is more positive than the grid of its non-conducting tube and this positive voltage forms the bias of the grid of thyratron 32 so that this tube conducts at the instant when cam 220 and contacts 44 connects the plate of said thyratron to the positive source B1; at the same instant the record is sensed by brushes 128 and 132. If and only if brush 132 is energized through cam 120 and contacts 84, the two contacts 40b and 140b close on contacts 40a and 140a of a usual comparison relay, whose electro-magnets are 40 and 140, and the contacts 36b and 136b of comparison electromagnets 36 and 136 are not actuated, so electro-magnet 113 is not energized. Electro-magnet 113 controls, when energized, any suitable means for indicating an error and such an indication occurs for every discordance with the preceding conditions. It is to be noted that brushes 128 and 132 may be positioned independently of brushes 3 (Fig. 1). When this comparison is made contact 43 can then connect grid 43 for an instant to a negative source to reset trigger to a conventional zero state, if it were not. Uni-directional elements 47, 46 and 48 prevents interaction of the reset between adjacent triggers.

It is to be noted that the check indication, although being closely dependent upon the datum, has no simple arithmetical signification, and the correspondence between the lines ABCD and the index point values has been chosen at random (it could be chosen otherwise without departing from the scope of the invention). This does not prevent the said check indication from conforming to the use which it is desired to make of it, because: if an isolated figure of the datum is changed, the registering device will be fed differently through the channels ABCD, and the result will therefore be different; if two consecutive figures of the datum are interchanged, their corresponding combinations along the channels ABCD will be subjected to different shifts, the combinations along the channels A'B'C'D' will be different, and the result will also be different.

Although the check indication has no simple arithmetical signification (in particular when the datum is 000,000, the check indication is not zero), this is of no importance for practical requirements in which, once the said indication has been recorded in the card, the latter is merely compared with a result "calculated" again by a device of the same type as that described above. For this comparison, it is advantageous to have eight registering positions instead of four, whereby it is readily possible to ascertain that there are no missing marks and no supplementary marks of the check indication formed in the registering device as compared with that read on the card.

It is to be noted that the invention is particularly convenient to apply, since the reading of the datum takes place from the points 9 to 0, and that the check indication is registered or compared only afterwards, at the point 12, that is to say, the operation is completed in one card cycle without slowing the operation of the accounting machine. It is also clear that the positions for the registration of the check indication need not necessarily correspond to those of the columns of the datum. Thus, they can occupy, on the line 12, all or part of these columns and extend outside these columns, over other zones of the card. According to a readily practicable modification of the invention, it is also possible to store the result "calculated" by the registering device in relays by a known method, and thereafter to register it, as usual, this time in a special column of the card.

Other modifications may be made without departing from the scope of the invention. The registering device could be a binary open-chain counter, and the impulses corresponding to the values of the index points could be entered in binary coded form (for example, at the point 5, the lines A and C could simultaneously be fed, A representing the value 1, and C the value 4). In addition, before the registration of the check indication in the registering device, a first value could be introduced so as to cancel the check indication for the datum assumed to be equal to 000,000. In this way, a relatively arithmetical signification could be attached to the check indication. It is also possible to provide a larger number of triggers in series in the chain of the registering device, so as to increase the number of distinct combinations and to increase the security against errors. For the same purpose it is also possible, again without departing from the scope of the invention, to increase the number of feed lines A . . . D, for example by using 6 lines, the points 0, 1, 2, 3, 4 and 5 feeding the registering device with single impulses, and the points 6, 7, 8 and 9 with double impulses, while five order shifts may be effected for five consecutive columns. Or again, ten feed lines may be employed, and only single impulses for feeding the registering device, etc.

I claim:

1. In a cyclically operated machine, a calculating arrangement to compute a check symbol in relation to a numerical data recorded on a card, this data being recorded in the form of indicia placed according to their indicative values on determined index-point positions of a series of card columns, said arrangement including an analyzing device to analyze the card moved in the direction of said columns, said device comprising means to produce a timed pulse for each indicium present in a column, relays responsive to said pulses and coordinated to said card columns, input conductors to each of which is allocated a different numerical value, a pulse distributor to send timed input pulses over said input conductors contact members in said pulse distributor and connected to said conductors so that predetermined combinations of the latter carry at least one of the input pulses during each of the points of a part of the machine cycle, a binary electronic counter comprising a number of trigger elements connected in a closed ring through delay-time networks, a number of parallel inputs in said binary electronic counter and equal to the number of said input conductors, a value shift arrangement connected between said input conductors and said inputs of the binary counter and comprising a series of groups of contacts and shifting connections between the different groups of contacts, each group being controlled by an associated one of said relays each time an indicium is analyzed in a corresponding column, the combinations of inputs of the counter receiving said input pulses being different for each of said points of the machine cycle, said combinations being modified according to which of the columns contains an analyzed mark during a point considered.

2. In a cyclically operated machine provided with a record analyzing station with means to sense a record which comprises a series of columns bearing in a zone of index-point lines, perforations representing by their positions a recorded datum, said means comprising a series of relays coordinated to said columns and energized at different points of a machine cycle in accordance with the positions of the perforations sensed, a pulse distributing device to send different combinations of timed input pulses over four input conductors during determined successive points of the machine cycle, a binary electronic counter comprising at least four bi-stable trigger elements connected as a closed loop through delay-time networks and provided with four parallel inputs, a value shift device connecting the said input conductors to said inputs of the counter, and comprising a series of contact groups and shifting connections between the contacts of the different contact groups, each group being operable by an associated relay of said sensing means, the said shifting connections being arranged so that, during the points of the machine cycle when no contact group is operated, different combinations of inputs of said counter receive corresponding combinations of said input pulses, whereas during the points of the machine cycle when one or more contact groups are operated, said combinations of inputs of the counter are modified according to which columns contain the perforations sensed, whereby after complete sensing of said zone, the conditions of said trigger elements in the counter represent in binary form the value of a check symbol related to said recorded datum.

3. The invention set forth in claim 2, wherein the shifting connections in said shift device are arranged between adjacent contact groups to cause order shifts differing in a recurrent manner for each sub-series of three contact groups.

4. In a recording machine provided with a card analyzing station with means for sensing a series of columns for marks arranged on a number of index-points lines within a "data" zone on a card, calculating means comprising a binary counter with four parallel inputs to receive entered code values and with at least four bi-stable trigger members to totalize the entered values on a numeration base at least equal to 15, entering means connected to the inputs of said counter for entering coded values represented by electric parameters and comprising pulse generating devices and an arrangement of shifting connections controlled by said sensing means, said arrangement of shifting connections being operative when each line of said "data" zone passes the analyzing station for entering different combinations of the values 1, 2, 4, 8, these combinations further varying according to which of the columns contain the marks analyzed, whereby when the "data" zone of the card has passed said analyzing station, the final conditions of said trigger members represent a check symbol in binary form, recording means individually controlled by the trigger members of said counter for recording the represented symbol in the same series of columns on a line of index-point positions different from the lines of said "data" zone on the same card.

5. In a record controlled machine provided with a record analyzing station with means for sensing a card which comprises a series of columns bearing in a first zone of index-point lines marks representative of a datum and in a second zone marks representative of a check symbol related to said datum, calculating means comprising a binary counter with four parallel inputs to receive entered code values and with at least four bi-stable trigger members to totalize the entered values according to a numeration base at least equal to 15, entering means connected to the inputs of said counter for entering therein coded values represented by electric parameters and comprising pulse generating means and an arrangement of shifting connections controlled by said sensing means, said arrangement of shifting connections being operative when each line of said first zone passes the analyzing station for entering different combinations of the values 1, 2, 4 or 8, these combinations further varying according to which of the columns contain the marks analyzed, whereby when said first zone of the card has passed said analyzing station, the resulting conditions of said trigger members represent a calculated check symbol in binary form, comparing means connected to the trigger members of the counter to receive therefrom the value of said calculated check symbol and connected to said sensing means, said comparing means being operative when the second zone of the card passes the analyzing station to compare the values of said calculated check symbol and of said check symbol sensed from the card, and control means controlled by said comparing means and operating differently according to the result of comparison.

No references cited.